United States Patent Office 3,051,618
Patented Aug. 28, 1962

3,051,618
BETA-HYDROXY-BUTYRIC ACID AMIDE DERIVATIVES AND PROCESS FOR THEIR USE AS NARCOTICS
Gustav Ehrhart, Bad Soden (Taunus), Ingeborg Hennig, Kelkheim (Taunus), Ernst Lindner, Frankfurt am Main, and Heinrich Ott, Eppstein (Taunus), Germany, assignors to Farbwerke Hoechst Aktiengesellschaft vormals Meister Lucius & Brüning, Frankfurt am Main, Germany, a corporation of Germany
No Drawing. Filed Apr. 24, 1959, Ser. No. 808,549
Claims priority, application Germany Nov. 6, 1956
13 Claims. (Cl. 167—52)

The present invention relates to beta-hydroxy-butyric acid amide derivatives of the general formula

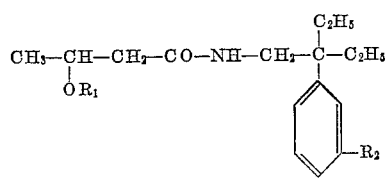

wherein $R_1$ represents a saturated aliphatic dicarboxy acyl group containing from four to six carbon atoms, and $R_2$ represents hydrogen, or alkoxy groups containing from one to four carbon atoms, and to non-toxic salts of said derivatives. The aforesaid compounds are valuable medicaments having sedative, hypnotic and narcotic properties and low toxicity.

This application is a continuation-in-part of our copending applications Serial No. 693,015, filed October 29, 1957, now Patent No. 2,941,002, and Serial No. 776,195, filed November 25, 1958.

The unsubstituted beta-hydroxy-butyric acid amide is described in Helv. Chim. Acta, 8 (1925), page 393,. Furthermore, N-disubstituted amides of branched beta-hydroxy-carboxylic acids are known from J. Am. Chem. Soc., 70 (1948), page 677, and 75, page 2416 (1953).

The compounds of this invention are preferably beta-hydroxy-butyric acid amide derivatives of the general formula

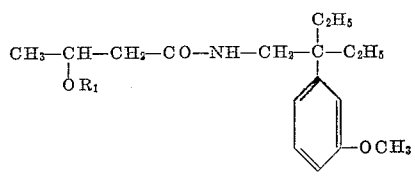

wherein $R_1$ represents a saturated aliphatic dicarboxy acyl group containing from four to six carbon atoms, and non-toxic salts of said derivatives. For the therapeutical administration, the sodium, potassium, ammonium, magnesium and calcium salts can be advantageously used.

A further object of the present invention is a therapeutic composition having sedative, hypotic and narcotic activity comprising, as active ingredient, a member of the group consisting of beta-hydroxy-butyric acid amide derivatives of the general formula

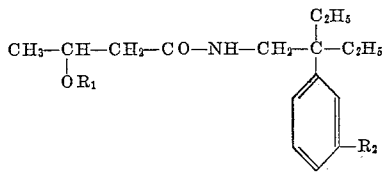

wherein $R_1$ is a saturated aliphatic dicarboxy acyl group containing from four to six carbon atoms, and $R_2$ is a member of the group consisting of hydrogen and alkoxy groups containing one to four carbon atoms, and non-toxic salts of said derivatives, and pharmaceutically acceptable carriers, said active ingredient being present in the composition in an amount from 0.1 to 5 grams per dosage unit.

The present invention relates also to the manufacture of such beta-hydroxy-butyric acid amide derivatives according to methods generally used for the preparation of substituted carboxylic acid amides. The following methods of preparation may particularly be mentioned:

The reaction of beta-hydroxy-butyric acid or beta-acyloxy-butyric acids of the formula

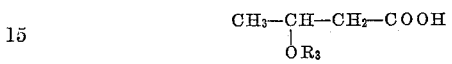

or their reactive derivatives with amines of the formula

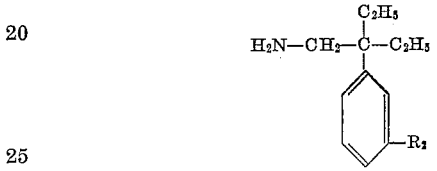

may be carried out according to known methods. In the formulae $R_2$ has the meaning give above and $OR_3$ means a hydroxy group that may be protected. It is advantageous to replace the radical $R_3$ in the hydroxy group in beta-position by a dicarboxylic acid radical, that may be substituted and corresponds to the meaning given for $R_1$, by means of the usual acylation methods, and, in case the radical $R_3$ stands for an aliphatic monocarboxy acyl group, it is possible previously to eliminate this radical by acid or alkaline hydrolysis. As beta-acyloxy-carboxylic acids may, for example, be mentioned: beta-acetoxy-butyric acid, beta-propionyloxy-butyric acid and beta-butyryloxy-butyric acid. According to the process of the present invention there are used with special advantage the alkyl esters of low molecular weight or phenyl esters of these acids which are reacted with the corresponding amines. This reaction is effected in the usual manner by prolonged heating of both components, if necessary in the autoclave. As amines may be used for example: 2-ethyl-2-phenyl-n-butyl-(1)-amine, 2-ethyl-2-(meta - methoxy - phenyl) - n - butyl - (1) - amine, 2 - ethyl - 2 - (meta - ethoxy - phenyl) - n - butyl - (1)-amine, 2 - ethyl - 2 - (meta - propoxy - phenyl) - n-butyl-(1)-amine and 2-ethyl-2-(meta-butoxy-phenyl)-n-butyl-(1)-amine. An advantageous process, starting from functional derivatives of the beta-hydroxy-butyric acids, is carried out by reacting beta-hydroxy-butyric acid halides, preferably the corresponding acid chlorides or acid bromides of the beta-hydroxy-butyric acids, with the above-mentioned amines. For the preparation of beta-hydroxy-butyric acid amides with a free hydroxyl group, the latter may be protected by a radical that is easy to eliminate. Upon termination of the reaction, this protective group is split off in the usual manner, for example by hydrolyzation with dilute alkalies or acids. This reaction is suitably carried out in an inert solvent, for example ether, benzene, toluene, methylene chloride or chloroform, in the presence of an agent splitting off hydrogen halide and, generally, it is already successful in the cold. It is of particular advantage to use, as the agent splitting off hydrogen halide, a second mol of the amine used for the reaction. The hydrogen halide of the amine that has separated can directly be filtered off with suction or be removed by shaking with water.

The products of the present invention may be prepared with particular advantage by means of the reduction of corresponding acetoacetic acid amides. By amides there are meant such compounds as contain the above-mentioned amines as amide components in the acid amide group.

The reduction of the keto group can, for example, be effected catalytically with the aid of metals of the 8th group of the Periodic System, preferably nickel catalysts, in the presence of the customary solvents such as aqueous alcohols, alcohols or water. Noble metals or Raney catalysts may also be used. It is also possible to reduce by means of nascent hydrogen, for example with aluminum amalgam and alcohol, sodium amalgam, lithium aluminum hydride or sodium boron hydride. The reaction may also be carried out electrolytically.

A dicarboxylic acid radical corresponding to the definition of $R_1$ can be substituted in the $\beta$-position by conventional acylation methods.

The acetoacetic acid amides used as starting substances are preferably obtained by reaction of amines of the formula

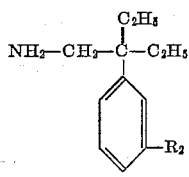

wherein $R_2$ has the aforesaid meaning, with diketene; the reduction of the acetoacetic acid amides obtained to the desired beta-hydroxy-butyric acid amide derivatives can also be carried out without isolation of these acetoacetic acid amides.

Furthermore, beta-hydroxy-butyric acid amides can be prepared according to the invention from the beta-amino-butyric acid amides which are obtained according to the usual methods. To these beta-amino-butyric acid amides having the desired substituent at the amide nitrogen atom, an equimolar quantity of a concentrated aqueous solution of an alkali metal nitrite, preferably sodium nitrite, is added dropwise, while stirring and, if necessary, while cooling, in the presence of a dilute mineral acid, preferably hydrochloric or sulfuric acid. The evolution of nitrogen indicating the transformation of the amino group into the hydroxy group generally occurs at room temperature. The reaction mixture is stirred for some time at room temperature, if necessary at moderately elevated temperatures (for example in the steam bath) until the evolution of the gas has ceased and the transformation of the amino group into the hydroxy group is complete. It is advantageous to introduce, by means of the usual acylation methods, an acyl radical that corresponds to the meaning given for $R_1$ into the hydroxy group in the beta-position of the compounds obtained.

As starting compound there is likewise suitable the beta-butyrolactone that can be prepared according to known processes, for example by catalytic hydrogenation of diketene. By reaction with the said amines of the formula

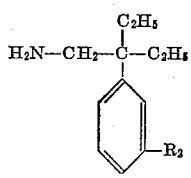

the corresponding beta-hydroxy-butyric acid amides of the formula

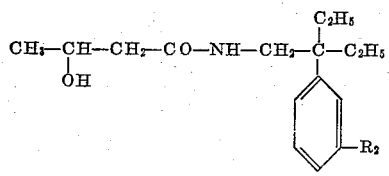

are obtained directly. This reaction takes place by the action of the two components in the presence or absence of solvents, for example water or organic solvents such as alcohols, benzene, toluene or ethers. Usually, the reaction sets in spontaneously and the reaction products can be isolated from the reaction mixture by fractional distillation or by crystallization. It is advantageous to convert the hydroxy group in beta-position of the compounds obtained by means of the usual acylation methods into an acyl radical that may be substituted and that corresponds to the meaning given for $R_1$.

The desired beta-hydroxy-butyric acid amide derivatives may also be obtained by methylating or ethylating the phenolic hydroxy group, if desired without isolation, of beta-hydroxy-butyric acid amide derivatives of the formula

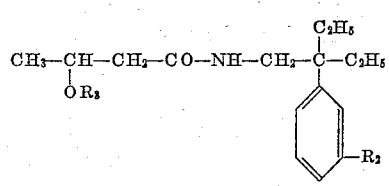

wherein $R_2$ and $OR_3$ stand for a hydroxy group that may be protected, and by replacing the radical $R_3$ in the hydroxy group in beta-position by means of the usual acylation methods by an acyl radical that may be substituted and that corresponds to the meaning given for $R_1$.

For preparation of the desired compounds of the above-mentioned formula, wherein $R_1$ means the radical of a dicarboxylic acid that may be substituted, the butyric acid amides with a free beta-hydroxy group obtainable in a manner described above may be esterified unilaterally with dicarboxylic acids that may be substituted and that are capable of forming inner anhydrides. As such dicarboxylic acids both carboxylic acid groups of which are preferably linked by 2–4 carbon atoms there may be mentioned: succinic acid, methyl-succinic acid, dimethyl-succinic acid, glutaric acid, methyl-glutaric acid, adipic acid, acyloxy-succinic acids, acyloxy-tartaric acids and acyl derivatives of amino-dicarboxylic acids. There are also suitable unsaturated dicarboxylic acids, such as maleic acid. For esterification there are advantageously used molar quantities of the anhydrides of the said dicarboxylic acids which are caused to act upon the beta-hydroxy-butyric acid amides in the presence of an organic solvent, for example, pyridine, in which case heating can be of advantage.

It is also possible to carry out the unilateral esterification with a dicarboxylic acid by reesterification of beta-acyloxy-butyric acid - [2 - (meta-alkoxy-phenyl)-2-ethyl-butyl-(1)]-amides. The reaction is carried out under the usual reesterification conditions.

For the therapeutical use of the products of the present invention it is of advantage to neutralize in the usual manner the other free carboxylic acid of the compounds obtained, particularly of the formula

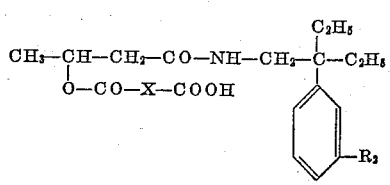

wherein $R_2$ has the meaning given above and X represents a saturated aliphatic hydrocarbon radical containing from 2–4 carbon atoms. The alkali metal salts, thus obtained, show a considerably increased solubility in water. As further suitable inorganic salts there may be mentioned the magnesium salt and the calcium salt. Salts can be formed which contain 2 mols of the acid mentioned above per mol of bivalent metal; there can also be prepared therapeutically useful salts which contain one mol of the above butyric acid and one mol of another acid per mol of bivalent metal. As acids appropriate for the further neutralization of the basic salts there enter into consideration: hydrochloric acid, acetic acid, propionic acid, benzoic acid, salicylic acid, acetylsalicylic acid, aceturic acid, malic acid, succinic acid, lactic acid.

The above-mentioned acids can likewise be neutralized by means of organic basic compounds. Aliphatic, cycloaliphatic or aromatic amines which, if necessary, can be substituted are suitable for this purpose. There are mentioned, for example: methylamine, ethylamine, diethylamine, diethyl-aminoethanol, p-aminobenzoyl, diethyl-aminoethanol, cyclohexylamine, N,N-diethyl-aminocyclohexane, dicyclohexylamine, N,N'-dibenzylethylenediamine, N-ethylaniline, hexahydro-N-ethylaniline, glucosamine, glucamine, N-methylglucamine, N-methylglucosamine.

These salts can be produced according to methods usually used for neutralization. For example, the suspension of the acid component in water can be reacted with an aqueous suspension of magnesium- or calcium-oxides, or -hydroxides or with magnesium- or calcium-carbonates or -bicarbonates, shaking or stirring, if necessary with slight heating, being favorable. Generally, the salt formed is dissolved. The aqueous solutions of the salts formed—if necessary filtered over charcoal—can be used directly or, if desired, they can be obtained by lyophilization in the form of a white powder.

Instead of water there can likewise be used organic solvents, if desired in admixture with water, especially when organic bases are used. In this case it is favorable to react both starting components in dilute form. Generally, the salt formed is precipitated from the solution without difficulty, otherwise it can be precipitated by adding a suitable solvent. When salts are used which are easily soluble in water, they can likewise be eliminated from organic solvents immiscible with water by shaking them out with water.

The new beta-hydroxy-butyric acid amide derivatives are valuable medicaments which are distinguished, apart from a low toxicity, by favourable therapeutic properties. According to the quantity of the dose administered they are suitable as sedatives, hypnotics and narcotics.

In order to examine its narcotic action, the magnesium salt of beta-succinoxy-butyric acid -[2-(meta-methoxy-phenyl)-2-ethyl-butyl-(1)]-amide was intravenously injected to mice in the form of an aqueous solution of 1% strength and in a dose of 75 milligrams/kilogram. The treated mice were narcotized and remained quietly on their backs. When the above-mentioned dose was given the narcosis lasted about 15 minutes. When 150 milligrams/kilogram were injected the animals remained narcotized for about 30 minutes. When using rats as test animals, it was observed that intravenous injection of 75 milligrams/kilogram of the compound mentioned likewise caused a narcosis of 15 minutes during which the animals could be turned on their backs and remained in this position. A dose of 150 milligrams/kilogram given to rats likewise caused a prolonged narcosis of about 30 minutes. Likewise in dogs the intravenous injection of an aqueous solution of 10% strength and applied in a dose of 40 milligrams/kilogram caused a deep, quiet narcosis which occurred about 5 minutes after injection. The postural reflexes could no longer be observed, whereas the corneal reflex could be realized. The animals remained on their backs. The greatest depth of the narcosis was maintained for about 30 minutes. One hour after injection the dogs ran about again. It is of special importance that the dogs fall asleep and wake up without excitation.

The above-mentioned magnesium salt as well as the acetic acid magnesium salt of beta-succinoxy-butyric acid-[2-(meta-methoxy-phenyl)-2-ethyl-butyl-(1)]-amide furthermore have the advantage that they cause a relaxation effect stronger than obtainable on administration of the same dose of any other known magnesium salt, for example, magnesium ascorbinate. Moreover, the calcium salt has the advantage of exhibiting an additional antiallergical effect. The para-aminobenzoyl-diethylaminoethanol salt of the above-mentioned acid exerts, in addition, a sedative action on vegetative excitation.

When intravenously injecting 75 mg./kg. of the sodium salt of beta-succinoxy-butyric acid-[2-(meta-methoxy-phenyl)-2-ethyl-butyl(1)]-amide in the form of an aqueous solution of 1% strength the treated mice were narcotized and they remained quietly on their backs. When administering the afore-mentioned dose the narcosis lasted for about 15 minutes. When 150 mg./kg. were injected, the narcosis lasted for about 30 minutes. When using rats as test animals an intravenous injection of 75 mg./kg. of the said compound likewise produced a narcosis lasting for 15 minutes during which the animals could be turned on their backs and remained there. 150 mg./kg. produced a prolonged effect also in the case of rats; the narcosis lasted for about 30 minutes. The same applies to the dog, in which case the intravenous injection of an aqueous 10% solution of 40 mg./kg. led to a deep and quiet narcosis starting 5 minutes after the injection. The postural reflexes had ceased while the corneal reflex could still be elicited; the animals remained on their backs. The greatest depth of the narcosis lasted for about 30 minutes. One hour after the injection, the dogs ran about again. Of special importance is that the dogs fall asleep and wake up without any excitation. A special advantage for the application of this product and other corresponding salts as medicament is its relatively low toxicity. When the said compound was given intravenously to mice or rats the toxicity amounted to 250 mg./kg. Furthermore, a great advantage of such products for their therapeutical use resides in the fact that they are markedly water-soluble. Whereas the beta-hydroxy-butyric acid-[2-(meta-methoxy-phenyl)-2-ethyl-butyl-(1)]-amide is practically insoluble in water and, therefore, for injection purposes has to be dissolved in propylene glycol, the products of the invention can be applied in the form of aqueous solution; thus the circulation is not affected unfavorably by the solvent.

In extended tests the sodium salt of the beta-succinoxy-butyric acid - [2 - (meta - methoxy-phenyl)-2-ethyl-butyl-(1)]-amide was likewise well tolerated: 8 rats were given for 9 weeks, 5 times a week, by intramuscular injection, 150 milligrams/kilogram of the sodium salt of beta-succinoxy-butyric acid-[2-(meta-methoxy-phenyl)-2 - ethyl - butyl - (1)]-amide. The still young animals showed an increase of weight according to their normal growth. The organs did not show any pathological alterations. 5 rabbits were given for 7 weeks, 5 times a week, by subcutaneous injection, 100 milligrams/kilogram of the sodium salt of beta-succinoxy-butyric acid-[2-(meta-methoxy-phenyl)-2-ethyl-butyl-(1)]-amide. The grown up animals showed only a small increase of weight. Histologically, the organs showed no alterations. 3 dogs were given for 7 weeks, 5 times a week, by subcutaneous injection, 50 milligrams/kilogram of the sodium salt of beta-succinoxy-butyric acid-[2-(meta-methoxy-phenyl)-2-ethyl-butyl-(1)]-amide. All three animals showed a decrease of weight. Histological alterations of the organs did, however, not occur.

After a great number of animal tests had been carried out, the results of clinical examinations in more than 600 patients show that the sodium salt as well as the magnesium salt of beta-succinoxy-butyric acid-[2-(meta-methoxy-phenyl)-2-ethyl-butyl-(1)]-amide had a mild and gratifying soporific effect. In other cases the simultaneous administration of $N_2O$ is recommendable. The preparations can therefore be considered as basal narcotics. The particular advantage of the preparations consists in their excellent postoperative tolerance.

As compared with compounds having similar therapeutical properties, for example, also with the barbiturates, the products of the present invention show the advantage that their narcotic action does not set in suddenly but gradually.

The products of the present invention may be administered per os as well as parenterally. They can be worked up to medicinal preparations, for example, to tablets or injection solutions. When preparing tablets there are added the usual carrier substances such as lactose, starch, tragacanth and magnesium stearate.

The following examples illustrate the invention but they are not intended to limit it thereto:

EXAMPLE 1

(a) *Beta-Hydroxy-Butyric Acid-[2-(Meta-Methoxy-Phenyl)-2-Ethyl-Butyl-(1)]-Amide*

17.5 grams of diketene are added dropwise, at 35 to 40° C., to 40 grams of 2-(meta-methoxy-phenyl)-2-ethyl-butyl-(1)-amine in 80 cc. of benzene. After stirring for 30 minutes at 70° C. the solvent is eliminated under reduced pressure, the remaining oily acetoacetic acid-[2-(meta-methoxy-phenyl) - 2 - ethyl - butyl-(1)]-amide (58 grams) is dissolved in 130 cc. of methanol and after addition of 60 cc. of water 2.3 grams of sodium boron hydride are added in portions. After the reaction has ceased the methanol is distilled off under reduced pressure and the residue is taken up in ether. After washing with water, drying and distilling off the solvent there are obtained 54 grams of beta-hydroxy-butyric acid-[2-(meta-methoxy-phenyl)-2-ethyl-butyl-(1)]-amide in the form of a viscous yellow oil.

*Analysis.*—Found for: C, 69.8; H, 9.5; N, 4.7. Calculated for: C, 69.6; H, 9.22; N, 4.78.

(b) *Beta-Succinoxy-Butyric Acid [2-(Meta-Methoxy-Phenyl)-2-Ethyl-Butyl-(1)]-Amide*

160 grams of beta-hydroxy-butyric acid-[2-(meta-methoxy-phenyl)-2-ethyl-butyl-(1)]-amide are heated for 90 minutes on the steam bath with 80 grams of succinic anhydride in 80 cc. of pyridine. After the pyridine has been distilled off, water and ether are added to the residue. The ether layer is washed with dilute hydrochloric acid and water and then extracted by means of a dilute sodium carbonate solution. After filtration in the presence of animal charcoal the aqueous alkaline solution is acidified and extracted with ether. After drying and distilling off the ether, water is added to the residue (200 grams of a colourless oil that can be crystallized by means of acetic acid ester/petrol ether; melting point 86–87° C.) and, while stirring, also 27.8 grams of anhydrous sodium carbonate in portions. After concentration of the neutral solution under reduced pressure the sodium salt of the beta-succinoxy-butyric acid-[2-(meta - methoxy - phenyl)-2-ethyl-butyl-(1)]-amide is obtained in the form of a white, strongly hygroscopic, amorphous powder.

EXAMPLE 2

*Beta-Succinoxy-Butyric Acid-[2-(Meta-Methoxy-Phenyl)-2-Ethyl-Butyl-(1)]-Amide*

50 grams of the amide obtained according to Example 1(a) are heated for 4 hours on the steam bath with 25 grams of succinic anhydride. The reaction product is taken up in benzene and washed with water. The benzene layer is extracted with a dilute sodium carbonate solution, the aqueous alkaline layer is acidified with dilute hydrochloric acid and extracted by means of ether. There are obtained 59 grams of the oily beta-succinoxy-butyric acid-[2-(meta-methoxy-phenyl) - 2 - ethyl - butyl-(1)]-amide. After addition of acetic acid ester and a little petroleum ether there are obtained 51 grams of the crystalline acid melting at 86–87° C.

100 cc. of 1 N-sodium hydroxide solution or 50 cc. of 2 N-sodium hydroxide solution are added, while stirring, to 39.3 grams of beta-succinoxy-butyric acid-[2-m-methoxyphenyl-2-ethyl-butyl-(1)]-amide. A clear solution showing a pH-value of 7 is formed which is liberated from its turbidity by filtration through a clarifying layer. After concentration, suitably by lyophilization, the sodium salt of beta-succinoxy-hydroxy-butyric acid-[2-m-methoxyphenyl-2-ethyl-butyl-(1)]-amide is obtained as a white powder.

Instead of dilute sodium hydroxide solution there can likewise be used for the neutralization 50 cc. of 2 N-ammonium hydroxide,
50 cc. of 2 N-potassium hydroxide solution,
2.92 grams of magnesium hydroxide made into a paste by means of 20 cc. of water or
2.80 grams of calcium oxide (made into a paste by means of 20 cc. of water).

The solutions obtained are completely clear—if necessary after purification through a clarifying layer—and they show a neutral reaction. After concentration, favorably by lyophilization, the corresponding magnesium-, potassium-, ammonium or calcium salts of beta-succinoxy-butyric acid-[2 - m - methoxy - phenyl-2-ethyl-butyl-(1)]-amides are obtained as white powders.

EXAMPLE 3

*Beta-Succinoxy-Butyric Acid-[2-Ethyl-2-Phenyl-Butyl-(1)]-Amide*

26.3 grams of beta-hydroxy-butyric acid-[2-ethyl-2-phenyl-butyl-(1)]-amide are heated for 90 minutes together with 10.0 grams of succinic acid anhydride and 10 cc. of pyridine. The reaction mixture is worked up as described in Example 1(b). The beta-succinoxy-butyric acid-[2-ethyl-2-phenyl-butyl-(1)]-amide is converted into the corresponding sodium, potassium, ammonium, magnesium and calcium salts as described in Example 2.

EXAMPLE 4

*Beta-[(Methyl-Succin)-Oxy]-Butyric Acid-[2-(Meta-Methoxy-Phenyl)-2-Ethyl-Butyl-(1)]-Amide*

58.6 grams of the amide obtained according to Example 1(a) are heated for 90 minutes on the steam bath with 22.8 grams of methyl-succinic anhydride and 40 cc. of pyridine. The reaction product is worked up as described in Example 1(b). The beta-methyl-succinoxy-butyric acid-[2-(meta - methoxy - phenyl)-2-ethyl - butyl-(1)]-amide is obtained in the form of a colourless oil (38 grams) that takes up the calculated quantity of sodium hydroxide solution when titrated. The beta-[(methyl-succin) - oxy]-butyric acid-[2-(meta-methoxy-phenyl)-2-ethyl-butyl-(1)]-amide is converted into the corresponding sodium, potassium, ammonium, magnesium and calcium salts as described in Example 2.

EXAMPLE 5

*Beta-Glutaroxy-Butyric Acid-[2-(Meta-Methoxy-Phenyl)-2-Ethyl-Butyl-(1)]-Amide*

58.6 grams of the amide obtained according to Example 1(a) are transformed in the manner described in Example 1(b) with 22.8 grams of glutaric acid anhydride and 30 cc. of pyridine into the beta-glutaroxy-butyric acid-[2-(meta-methoxy-phenyl)-2-ethyl-butyl-(1)]-amide. The beta-glutaroxy-butyric acid-[2-(meta-methoxy-phenyl)-2-ethyl-butyl-(1)]-amide is converted into the corresponding sodium, potassium, ammonium, magnesium and calcium salts as described in Example 2.

EXAMPLE 6

(a) *Beta-Hydroxy-Butyric Acid-[2-(Meta-Hydroxy-Phenyl)-2-Ethyl-Butyl-(1)]-Amide*

24.1 grams of 2-(meta-hydroxy-phenyl)-2-ethyl-butyl-(1)-amine are suspended in 100 cc. of benzene. To the suspension there is added dropwise at 30–40° C. a solution of 10.5 grams of diketene in 30 cc. of benzene. When the dropwise addition is finished, the reaction mixture is heated for a short time to 60° C. and the benzene is then distilled off under reduced pressure. The remaining 35.5 grams of aceto-acetic acid-[2-(meta-hydroxy-phenyl)-2-ethyl-butyl-(1)]-amide are dissolved in 150 cc. of methanol and to the solution are added 10 cc. of water and 4.5 grams of sodium boron hydride in portions. After acidification with dilute hydrochloric acid water is added. 29.5 grams of beta-hydroxy-butyric acid-[2-(meta-hydroxy-phenyl)-2-ethyl-butyl-(1)]-amide crystallize. The melting point amounts to 153° C. after recrystallization from water/alcohol.

(b) *Succinoxy-Butyric Acid-[2-(Meta-Ethoxy-Phenyl)-2-Ethyl-Butyl-(1)]-Amide*

14 grams of beta-hydroxy-butyric acid-[2-(meta-hydroxy-phenyl)-2-ethyl-butyl-(1)]-amide are shaken for 5 hours with 26 cc. of a 2 N-sodium hydroxide solution, 50 cc. of water and 8 grams of diethyl sulfate, whereupon an oil deposits. After extraction with ether and washing of the ether layer there are obtained 10.8 grams of a viscous oil (analysis.—N, calculated: 4.56; found: 4.55).

From the beta-hydroxy-butyric acid-[2-(meta-ethoxy-phenyl)-2-ethyl-butyl-(1)]-amide formed there is obtained with succinic anhydride and pyridine in the manner described in Example 1(b) the sodium salt of beta-succinoxy - butyric - acid - [2 - (meta - ethoxy - phenyl - 2 - ethyl - butyl - (1)] - amide in the form of a white, amorphous powder. The beta-succinoxy-butyric acid-[2-(meta-ethoxy-phenyl)-2-ethyl-butyl-(1)]-amide is converted into the corresponding potassium, ammonium, magnesium and calcium salts as described in Example 2.

EXAMPLE 7

*Beta-Succinoxy-Butyric Acid-[2-(Meta-Methoxy-Phenyl)-2-Ethyl-Butyl-(1)]-Amide*

39.2 grams of beta-succinoxy-butyric acid-[2-(meta-methoxy-phenyl)-2-ethyl-butyl-(1)]-amide, 150 cc. of water, 5.8 grams of magnesium hydroxide and 6 grams of glacial acetic acid are shaken together until dissolution sets in. After filtration with charcoal a clear, aqueous solution showing a pH-value of 7.2 is obtained from which, after concentration, the acetic magnesium salt of the beta-succinoxy-butyric acid-[2-(meta-methoxy-phenyl)-2-ethyl-butyl-(1)]-amide is obtained.

Magnesium content—calculated: 5.05%; found: 5.12%. Instead of 6 grams (corresponding to 1/10 mol) of acetic acid there can likewise be used 1/10 mol each of hydrochloric acid, propionic acid, lactic acid, benzoic acid, salicylic acid, acetylsalicylic acid, aceturic acid, or 1/20 mol each of malic acid or succinic acid. By working up the solutions obtained there is formed the corresponding hydrochloric acid, propionic acid, lactic acid, malic acid, benzoic acid, succinic acid, salicylic acid, acetylsalicylic acid or aceturic acid magnesium salt of beta-succinoxy-butyric acid-[2-(meta-methoxy-phenyl)-2-ethyl-butyl-(1)]-amide.

EXAMPLE 8

*Diethylamino - Ethanol - Salt of Beta - Succinoxy - Butyric Acid-[2 - (Meta - Methoxy - Phenyl) - 2 - Ethyl - Butyl - (1)] - Amide*

16 grams of beta-succinoxy-butyric-acid-[2-(meta-methoxy-phenyl)-2-ethyl-butyl-(1)]-amide, 4.7 grams of diethylamino-ethanol and 100 cc. of water are stirred until dissolution sets in. After filtration an aqueous solution showing a pH-value of 7.0 to 7.2 is obtained from which, after concentration, the diethylamino-ethanol-salt of beta-succinoxy-butyric acid-[2-(meta-methoxy-phenyl)-2-ethyl-butyl-(1)]-amide is obtained.

EXAMPLE 9

*N-Methyl-Glucosamine Salt of Beta-Succinoxy-Butyric Acid - [2 - (Meta - Methoxy - Phenyl) - 2 - Ethyl - Butyl - (1)] - Amide*

6.4 grams of N-methyl-glucosamine and 50 cc. of water are added to 13 grams of beta-succinoxy-butyric acid-[2 - (meta - methoxy - phenyl) - 2 - ethyl - butyl - (1)]-amide. The filtered solution shows a pH-value of 7.2 to 7.3. After concentration of the solution the N-methyl-glucosamine salt of beta-succinoxy-butyric acid-[2-meta-methoxy-phenyl)-2-ethyl-butyl-(1)]-amide is obtained in the form of a white powder.

EXAMPLE 10

*N - Methyl - Glucamine - Salt of Beta - Succinoxy - Butyric Acid - [2 - (Meta - Methoxy - Phenyl) - 2 - Ethyl-Butyl - (1)] - Amide*

3.88 grams of N-methyl-glucamine and 25 cc. of water are added to 7.84 grams of beta-succinoxy-butyric acid - [2 - (meta - methoxy - phenyl) - 2 - ethyl - butyl-(1)] - amide. After concentration of the solution the N-methyl-glucamine-salt of beta-succinoxy-butyric acid-[2 - (meta - methoxy - phenyl) - 2 - ethyl - butyl - (1)]-amide is obtained in the form of a product easily soluble in water. After concentration of the aqueous solution it constitutes a white powder.

EXAMPLE 11

*p-Amino-Benzoyl-Diethylamino-Ethanol-Salt of Beta-Succinoxy-Butyric Acid-[2-(Meta-Methoxy-Phenyl)-2-Ethyl-Butyl-(1)]-Amide*

50 cc. of water and 7.08 grams of p-aminobenzoyl-diethylamino-ethanol are added to 11.79 grams of beta-succinoxy-butyric acid-[2-(meta-methoxy-phenyl)-2-ethyl-butyl-(1)]-amide. The solution shows a pH-value of 7.0. After concentration of the filtered solution the p-amino - benzoyl - diethylamino - ethanol - salt of beta-succinoxy - butyric acid - [2 - (meta - methoxy - phenyl)-2 - ethyl - butyl - (1)] - amide is obtained in the form of a white powder.

EXAMPLE 12

(a) A solution of 25 grams of dicyclohexylamine in 150 cc. of ethyl acetate is added to a solution of 54 grams of beta-succinoxy butyric acid-[2-(meta-methoxy-phenyl)-2-ethyl-butyl-(1)]-amide, in 150 cc. of ether. The mixture at first remains clear; upon inoculation the dicyclo-hexylamine-salt of beta-succinoxy-butyric acid-[2-(meta-methoxy-phenyl)-2-ethyl-butyl-(1)]-amide crystallizes out. It melts at 109–111° C., the yield amounts to 82% of the theory.

(b) A solution of 8 grams of dicyclohexylamine in 30 cc. of ether is added to a solution of 17.3 grams of beta-succinoxy - butyric acid - [2 - (meta - methoxy-phenyl)-2-ethyl-butyl-(1)]-amide. A syrup is precipitated immediately. The syrup is treated with 5 times its quantity of hot water, whereby an oil is formed, which on cooling to room temperature, is dissolved. After prolonged standing (about 24 hours) the dicyclohexyl-amine salt of beta-succinoxy-butyric acid - [2 - (meta - methoxy - phenyl)-2-ethyl-butyl-(1)]-amide which melts at 109–110° C., crystallizes out from this solution. By reacting in analogous manner the solution of 7.84 grams of beta-succinoxy-butyric acid - [2-(m-methoxy-phenyl)-2-ethyl-butyl-(1)]-amide in 30 cc. of ether with the solution of 2.4 grams of N,N'-dibenzyl-ethylene-diamine in 30 cc. of ether there is obtained the N,N'-dibenzyl-ethylene-diamine-salt of beta-succinoxy-butyric acid - [2 - (m-methoxy-phenyl)-2-ethyl-butyl-(1)]-amide.

When reacting in an analogous manner the solution of 7.84 grams of beta-succinoxy-butyric acid-[2-m-methoxy-phenyl)-2-ethyl-butyl-(1)]-amide in 30 cc. of ether with the solution of 2.54 grams of hexahydro-N-ethyl-aniline in 25 cc. of ethyl acetate, there is obtained the hexahydro-N-ethyl-aniline-salt of beta-succinoxy-butyric acid-[2-(m-methoxy-phenyl)-2-ethyl-butyl-(1)]-amide. When reacting in an analogous manner the solution of 7.84 grams of beta-succinoxy-butyric acid - [2 - (m-methoxy-phenyl)-2-ethyl-butyl-(1)]-amide in 30 cc. of ether with the solution of 3.0 grams of N,N-diethylamino-cyclohexane in 50 cc. of benzene, there is obtained the N,N'-diethylamino-cyclohexane salt of beta-succinoxy-butyric acid-[2-(m-methoxy-phenyl)-2-ethyl-butyl-(1)]-amide.

We claim:

1. A member of the group consisting of beta-hydroxybutyric acid amide derivatives of the general formula

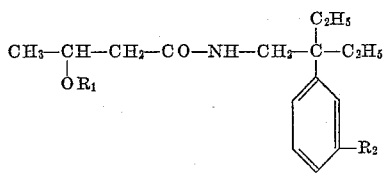

wherein $R_1$ represents a saturated aliphatic dicarboxy acyl group containing from four to six carbon atoms; and $R_2$ is a member of the group consisting of hydrogen and alkoxy groups containing one to four carbon atoms, and nontoxic alkali metal, ammonium, magnesium and calcium salts of said derivatives.

2. A member of the group consisting of beta-hydroxybutyric acid amide derivatives of the general formula

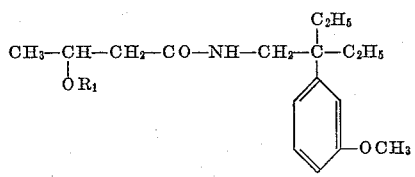

wherein $R_1$ represents a saturated aliphatic dicarboxy acyl group containing from four to six carbon atoms, and non-toxic alkali metal, ammonium, magnesium and calcium salts of said derivatives.

3. Beta-hydroxy-butyric acid amide derivatives of the formula

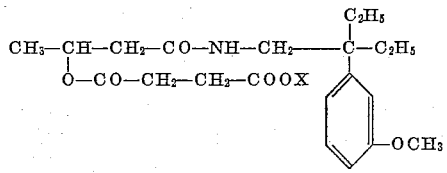

wherein X is a member of the group consisting of hydrogen, sodium, potassium, ammonium, and the groups —Mg—Y and —Ca—Y, in which Y is a member selected from the group consisting of Cl, acyl groups of mono- and dicarboxylic acids, and the radical

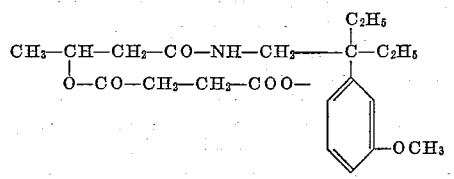

4. The compound of the formula

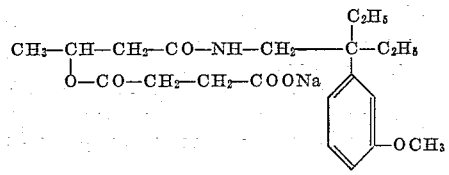

5. The compound of the formula

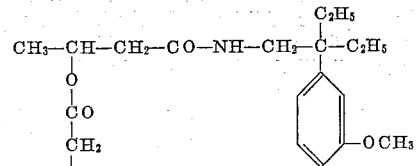

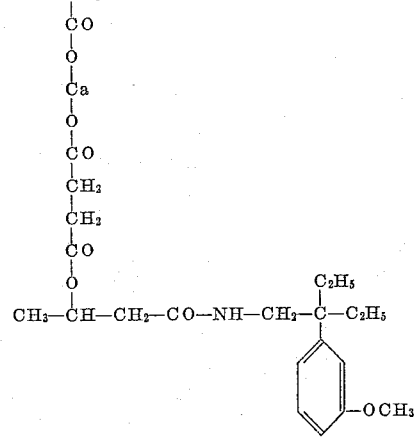

6. The compound of the formula

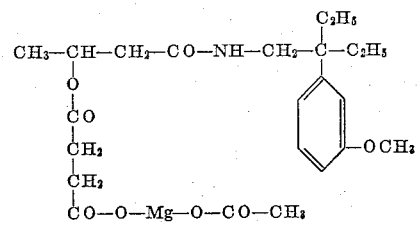

7. A therapeutic composition having sedative, hypnotic and narcotic activity comprising as active ingredient a member of the group consisting of beta-hydroxy-butyric acid amide derivatives of the general formula

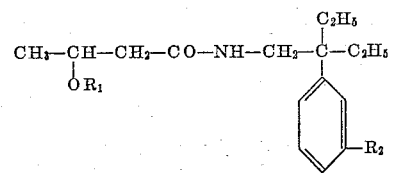

wherein $R_1$ represents a saturated aliphatic dicarboxy acyl group containing from four to six carbon atoms, and $R_2$ is a member of the group consisting of hydrogen and alkoxy groups containing one to four carbon atoms and non-toxic alkali metal, ammonium, magnesium and calcium salts of said derivatives and pharmaceutically acceptable carriers, said active ingredient being present in the composition in an amount from 0.1 to 5 grams per dosage unit.

8. A therapeutic composition for parenteral administration having sedative, hypnotic and narcotic activity comprising as active ingredient a beta-hydroxy butyric acid amide derivative of the general formula

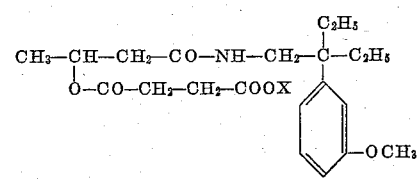

wherein X is a member of the group consisting of hydrogen, sodium, potassium, ammonium, and the groups —Mg—Y and —Ca—Y in which Y is a member selected from the group consisting of Cl, acyl groups of mono and dicarboxylic acids, and the radical

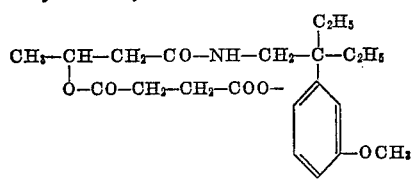

and pharmaceutically acceptable carriers, said active ingredient being present in the composition in an amount from 0.1 to 5 grams per dosage unit.

9. A therapeutic composition for parenteral administration having sedative, hypnotic and narcotic activity comprising as active ingredient a beta-hydroxy-butyric acid amide derivative of the formula

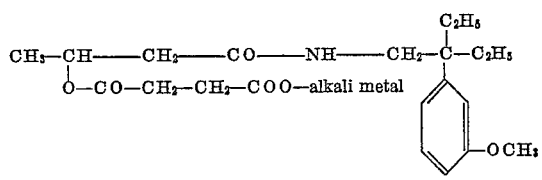

and pharmaceutically acceptable diluents, said active ingredient being present in the composition in an amount from 0.1 to 5 grams per dosage unit.

10. The compound of the formula

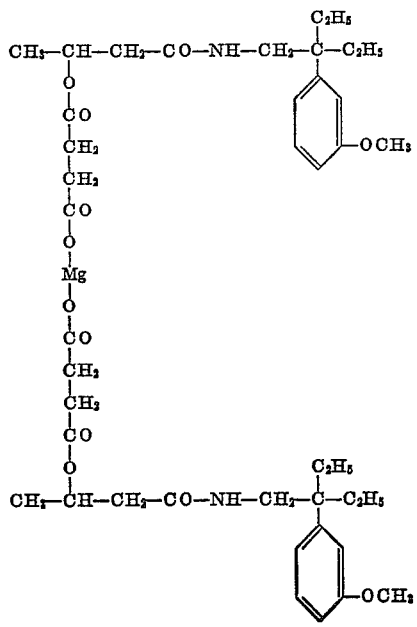

11. The compound of the formula

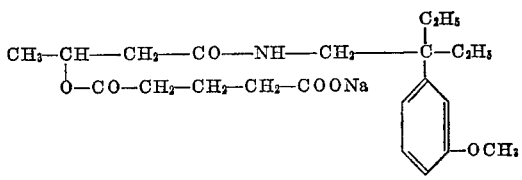

12. The compound of the formula

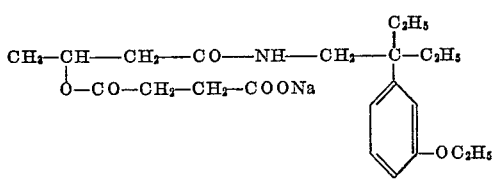

13. Narcotization method which comprises administering a member of the group consisting of beta-hydroxybutyric acid amide derivatives of the general formula

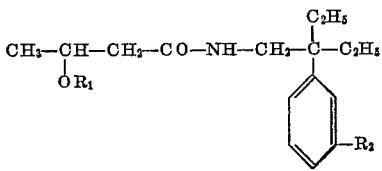

wherein $R_1$ represents an aliphatic dicarboxy acyl group containing from four to six carbon atoms; and $R_2$ is a member of the group consisting of hydrogen, hydroxyl and alkoxy groups containing one to four carbon atoms, and non-toxic alkali metal, ammonium, magnesium and calcium salts of said derivatives.

References Cited in the file of this patent
UNITED STATES PATENTS

| | | |
|---|---|---|
| 2,853,418 | Smith | Sept. 23, 1958 |
| 2,871,260 | Drysdale | Jan. 27, 1959 |
| 2,871,261 | Klaui | Jan. 27, 1959 |
| 2,872,370 | Berger | Feb. 3, 1959 |
| 2,941,002 | Ehrhart et al. | June 14, 1960 |